Jan. 26, 1960     N. L. JEGLUM     2,922,971
GAGING DEVICE
Filed March 28, 1956
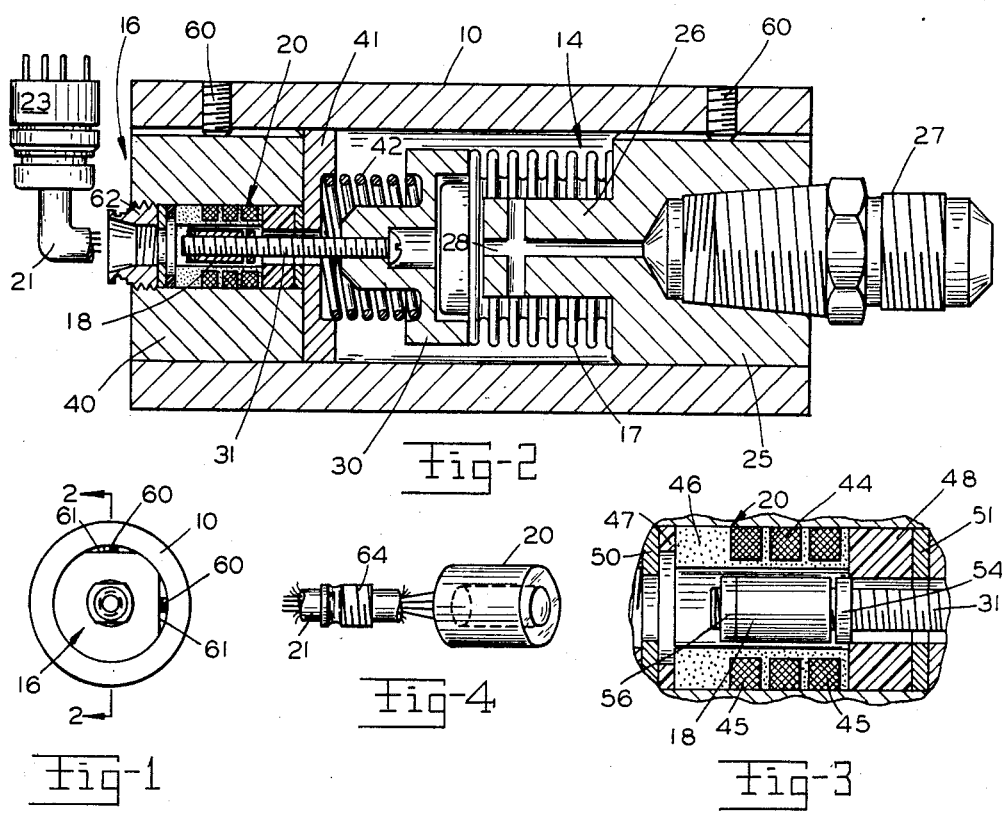
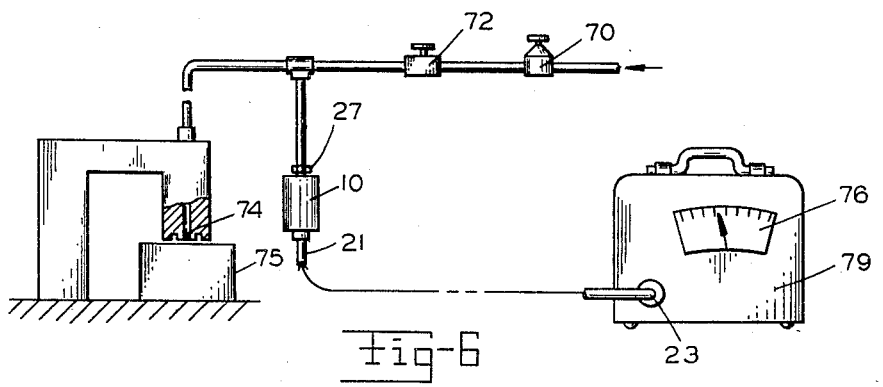
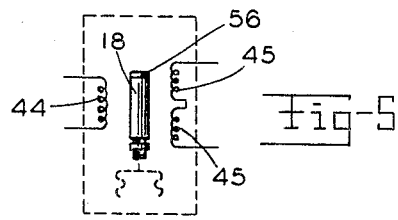
INVENTOR.
Norman L. Jeglum
BY Edward J. Noegr.

though the bellows 17 is fixed
as by brazing to one end of plug 25 and the plug has
an extension 26 within the bellows to decrease the bellows
volume and act as a stop to limit its contraction at a
desired position. Coupling 27, adapted for connection to
an air leakage gaging system, communicates with passages 28 leading to the interior of bellows 17 through
extension 26. The outer end of bellows 17 is seated in a
bellows cap 30 which, in turn, carries a core shaft 31
supporting core 18 within the annular transformer assembly 20. Thus expansions and contractions of bellows 17
are converted into movements of core 18 within the
transformer windings to obtain the desired electrical
signals.

2,922,971

GAGING DEVICE

Norman L. Jeglum, Dayton, Ohio, assignor, by mesne assignments, to The Sheffield Corporation, a corporation of Delaware Application March 28, 1956, Serial No. 574,482

4 Claims. (Cl. 336—30)

This invention relates to air-electric transducers and more particularly to a transducer for converting pressures obtained in an air leakage gaging system or the like into electric signals for the operation of indicators, part selection mechanisms, machine controls and the like.

It is an object of this invention to provide an air-electric transducer which is extremely simple in construction and which is reliable for repeated operations of high precision through a long service life.

It is a further object to provide such a transducer for high precision operation which is very compact and which includes air and electric connections extending from opposite ends thereof for respective connection to an air leakage gaging system or the like and an electric signal circuit.

It is a further object to provide such an apparatus wherein an elongated transducer body carries electric and pressure units relatively adjustable within the body, the electric unit including an annular unit such as a differential transformer and the pressure unit actuating a core or armature movable within the transformer unit.

Other objects and advantages of the invention will be apparent from the following description, the appended claims, and the accompanying drawing, in which, Figure 1 is an end view of a transducer unit embodying the present invention, Figure 2 is a sectional view taken on line 2—2 of Figure 1, Figure 3 is an enlarged fragment of the section of Figure 2, Figure 4 illustrates the transformer assembly, Figure 5 is a fragmentary electrical diagram, and Figure 6 illustrates an exemplary application of the unit.

Prior devices for converting pressures to electrical responses have been complex and expensive to manufacture and unreliable for operations of a high precision character. The transducer of the present invention is extremely simple to manufacture and is reliable for repeated operations of extremely high precision. For these reasons it has particular application to converting pressures such as obtained in an air leakage gaging system for measuring product characteristics and the like to electric signals for the actuation of part segregating gates, machine control, and similar functions. It will be understood that the present invention would have application wherever the necessity arises for an economical unit which is reliable for converting pressures to electrical signals with extremely high precision.

Referring more particularly to the drawings, the transducer comprises an elongated body 10 of annular configuration supporting a pressure unit 14 and an electric unit 16. The pressure unit includes an expansible bellows 17 which moves a core or armature 18 within a differential transformer assembly 20 connected through leads contained in cable 21 to plug 23.

Plug 25 of pressure unit 14 is slidably fitted within body 10 adjacent one end thereof. Bellows 17 is fixed as by brazing to one end of plug 25 and the plug has an extension 26 within the bellows to decrease the bellows volume and act as a stop to limit its contraction at a desired position. Coupling 27, adapted for connection to an air leakage gaging system, communicates with passages 28 leading to the interior of bellows 17 through extension 26. The outer end of bellows 17 is seated in a bellows cap 30 which, in turn, carries a core shaft 31 supporting core 18 within the annular transformer assembly 20. Thus expansions and contractions of bellows 17 are converted into movements of core 18 within the transformer windings to obtain the desired electrical signals.

Transformer 20 is a commercially available unit supported within plug 40 of electrical assembly 16. A spring retaining plate 41 abuts the end of assembly 16 and receives one end of a spring member 42 extending between it and bellows cap 30. Spring 42 thus acts in opposition to expansion of bellows 17 and controls its movement. Springs of different characteristics can be used for different applications as necessary. In one commercial example where it is desired to achieve minute armature movements in response to relatively wide pressure changes, spring 42 has a constant of 400 pounds per inch deflection. Conversely where relatively large armature movements in response to small pressure changes are desired a spring with a smaller constant could be used.

Referring most particularly to Figure 3, the transformer 20 includes exciter winding 44 and pick up windings 45 supported in an inert plastic mass 46. In order that the electrical characteristics will be symmetrical to each side of the central location of core 18, washers 47 and 48 are placed at each end of the transformer assembly and are formed of an electrically inert material such as Formica or the like. Washer 48 being of considerable greater thickness than washer 47 insures that the inert mass to one side of the transformer windings is symmetrical to that at the other side. In addition to this the windings are effectively isolated by the provision of closed, or "shorted" turns 50 and 51 of brass or the like. In this manner similar electrical signal responses are obtained with equal movements of core 18 in either direction from its central location with respect to the transformer windings.

Because of location and other peculiarities of each particular assembly an adjustable nut 54 made of brass in this example is adjustable along core shaft 31 in order to obtain the desired null signal with core 18 centrally located. Core 18 is threaded onto shaft 31 and is held firmly in position by a lock nut 56.

The transducer is easily assembled, for example, by inserting electrical unit 16 into one end of body 10, then inserting pressure unit 14 into the other end, core 18 moving, with clearance, through the adjacent end of unit 16 to a position within transformer 20. In addition to the compensation provided by compensating nut 54, pressure and electric units 14 and 16 are readily adjustable within body 10. After such adjustment to achieve the desired basic relation between core 18 and transformer 20, these units are clamped in position by set screws 60 engaging flats 61 on the unit plugs. This relative adjustment of the units also makes it possible to select the portion of the effective range of spring 42 within which the transducer will operate. This provides a control of the amplification relation between pressure changes and core movement because of the variation in spring rate within the effective range of a given spring.

Transformer assembly 20 is held firmly in location by nut 62 threaded within plug 40 and cable 21 is firmly held by nut 64 threaded within retaining nut 62.

Figure 5 diagrammatically illustrates the relationship between the core 18, exciter winding or coil 44 and pick up windings or coils 45. Upon shifting of core 18 in either direction from a central location the balance between the opposed windings is disturbed and the resulting signal obtained varies in magnitude in accordance with the amount of displacement and in sense with the direction thereof.

The windings can be connected to any suitable external electrical circuit. A circuit which can be utilized is illustrated and described in detail in application No. 501,602, filed April 15, 1955.

Figure 6 shows an exemplary air gaging system in which the transducer of this invention is employed. Air is supplied under pressure from a suitable source and flows through a regulator 70, an adjustable restriction 72, and through an open orifice 74. The leakage through orifice 74 is determined by the vertical dimension of a part 75 in gaging position and pressures between restriction 72 and the orifice will vary in accordance therewith. Coupling 27 is connected to this system downstream of restriction 72 and the pressures obtained are therefore applied to the interior bellows 17 which flexes in accordance therewith to position core 18 within transformer 20. Cable 21 is connected through plug 23 with a suitable amplifier 79 in this example having an indicator 76.

Thus it is seen that a transducer unit has been provided which has advantages in construction and adjustability. Through use of the transducer of this invention pressure changes in precision gaging systems or the like are accurately converted into electric signals for applications as desired.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An air-electric transducer comprising an elongated body having an elongated smooth-walled passage of uniform transverse section, a pressure responsive unit including a first plug freely fitted into said passage adjacent one end of said body, an expansible bellows sealably connected to and supported by said plug and extending from one end of the plug and along the passage axis, a movable core carried by said bellows for movement therewith, an electric unit including a second plug freely fitted into said passage adjacent the other end of said body and including an annular electric assembly coaxial with said body passage and in which said core is movably carried with clearance, spring means in said body passage cooperating between the adjacent ends of said bellows and said electric unit and acting in opposition to bellows expansion, pressure and electrical connections extending from the respective plugs at each end of the body and centrally of the body passage, said first plug including passage means extending from the pressure connection to the interior of said bellows said units being relatively adjustable within said body, first clamp means cooperating between said body and the first of said plugs, and second clamp means cooperating between said body and the second of said plugs, both of said clamp means being readily accessible and adjustable from the exterior of said body, whereby the units are independently adjustable in said body and clamped in their adjusted relative positions to determine the basic relation between said movable core and said electric assembly.

2. An air-electric transducer as set forth in claim 1, further comprising a plate freely carried within said body passage abutting one end of said electric assembly and in engagement with one end of said spring means.

3. An air-electric transducer as set forth in claim 1 wherein the plug of the pressure responsive unit extends into said bellows to decrease the interior volume thereof and act as a stop against bellows contraction, said plug extension including passage means adapted for connection to the air leakage gaging system.

4. An air-electric transducer comprising an elongated body of annular configuration, a pressure-responsive unit including a substantially cylindrical plug slidably fitted in said body adjacent one end thereof, said plug having connection means centrally located at its exterior end and a bellows in sealed connection with the plug at the other end thereof extending along the body axis, said plug having passage means extending from the connection to the interior of the plug, a core fixedly attached to said bellows and movably carried thereby in accordance with expansion and contraction thereof, an electric unit including a substantially cylindrical plug slidably fitted in said body adjacent the other end thereof and including an annular transformer assembly within which said core is movable with clearance, connection means to said transformer assembly centrally located at the outer end of the electric unit plug, spring means acting between said electric assembly and said bellows and retaining means carried by said body relatively spaced axially therealong and independently operable for engagement with each respective plug to fix the units in their adjusted relative positions and to determine the basic relation between said movable core and said transformer assembly, both of said retaining means being readily accessible and adjustable from the exterior of said body.

References Cited in the file of this patent

UNITED STATES PATENTS

| | | |
|---|---|---|
| 2,623,940 | Templeman | Dec. 30, 1952 |
| 2,627,183 | Greenwood | Feb. 3, 1953 |
| 2,657,350 | Rossire | Oct. 27, 1953 |
| 2,715,680 | Tatel | Aug. 16, 1955 |
| 2,768,359 | Side | Oct. 23, 1956 |